July 19, 1927.  A. F. MASURY ET AL  1,636,524
LUBRICATING SYSTEM
Filed Jan. 2, 1926   2 Sheets-Sheet 2
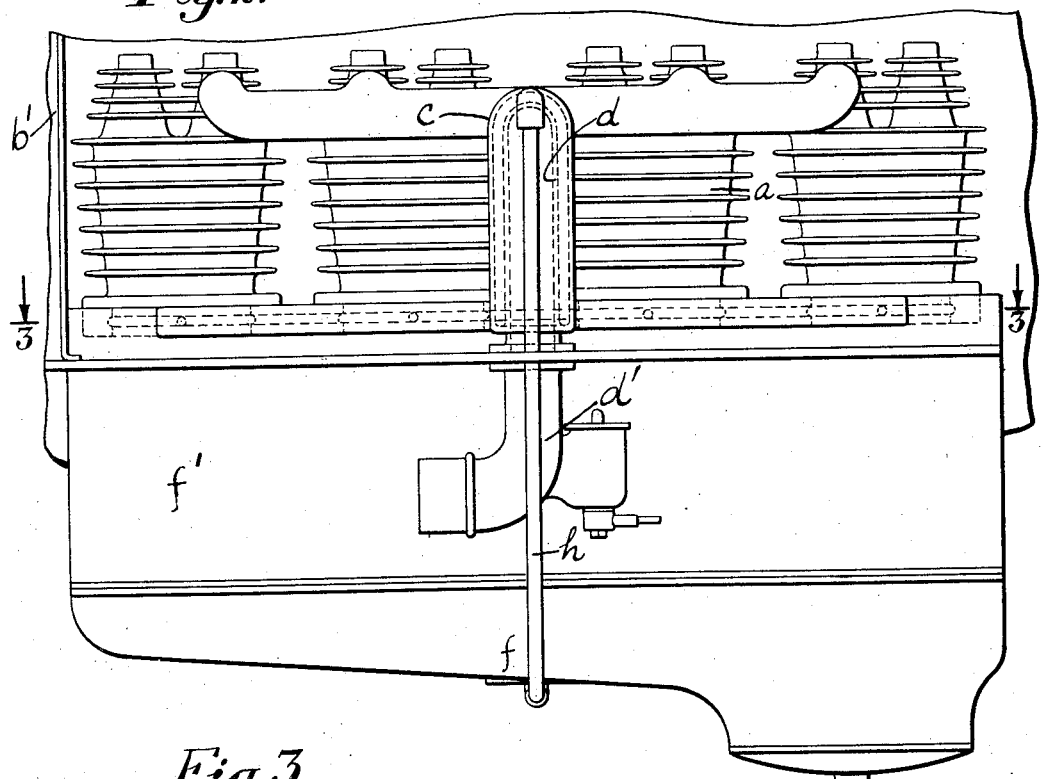
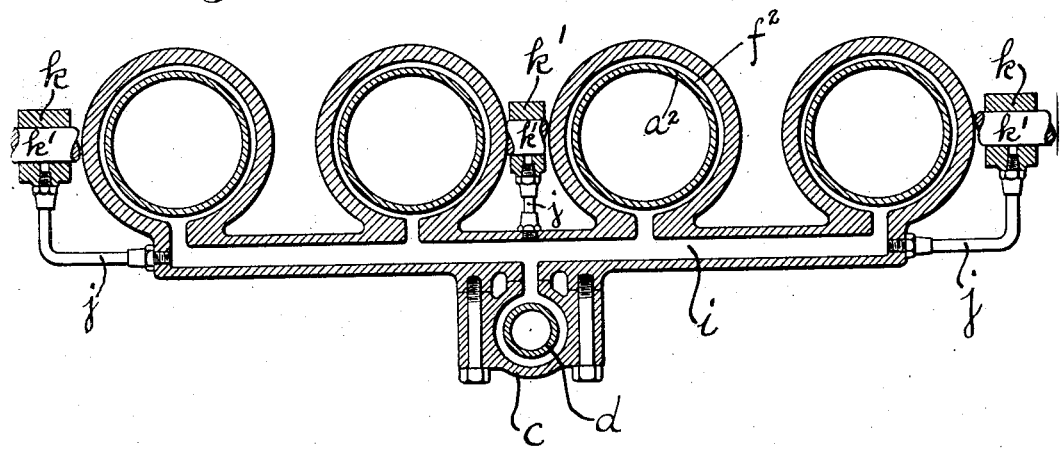

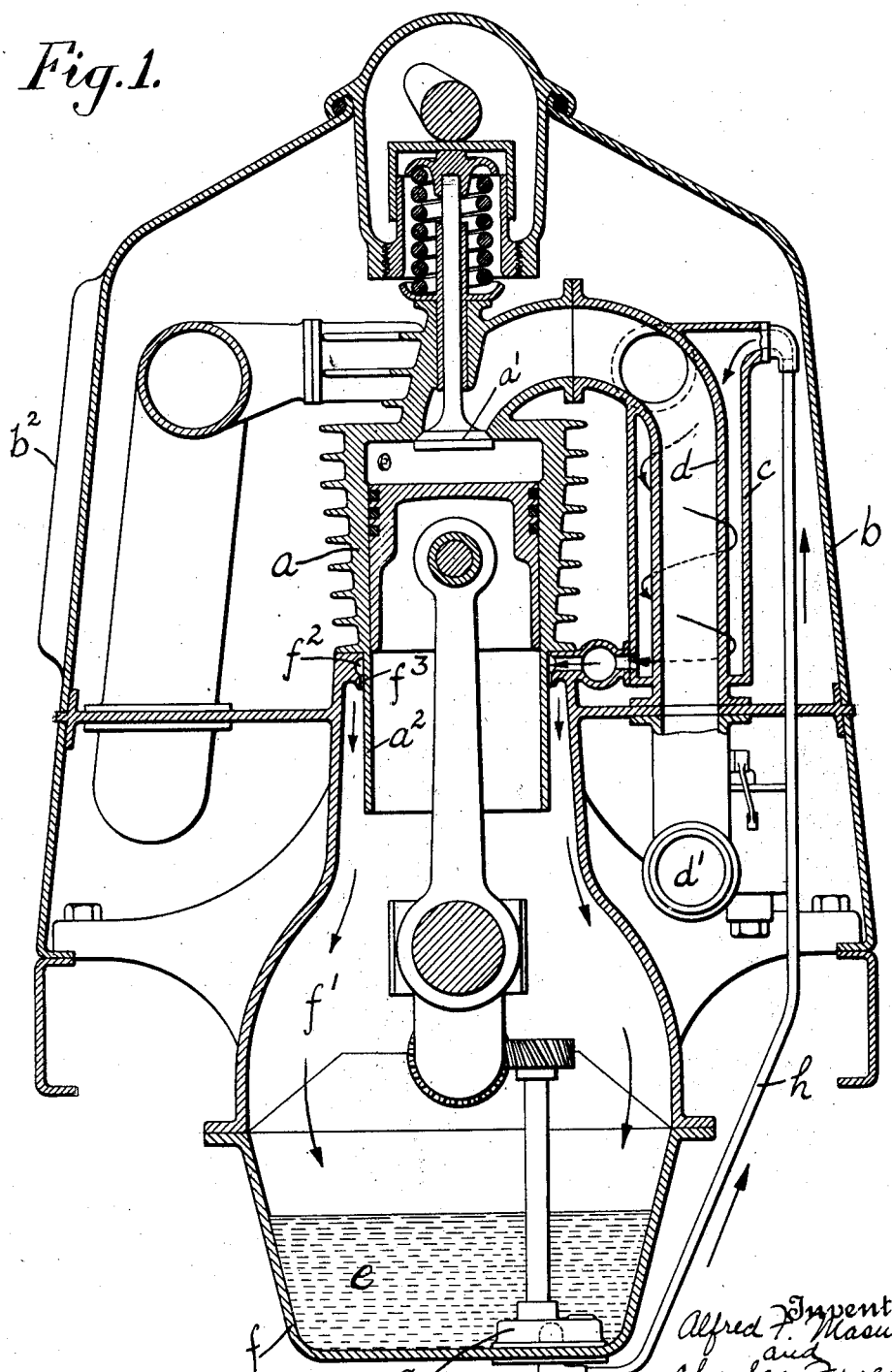

Patented July 19, 1927.

1,636,524

UNITED STATES PATENT OFFICE.

ALFRED F. MASURY AND CHARLES FROESCH, OF NEW YORK, N. Y., ASSIGNORS TO INTERNATIONAL MOTOR COMPANY, OF NEW YORK, N. Y., A CORPORATION OF DELAWARE.

LUBRICATING SYSTEM.

Application filed January 2, 1926. Serial No. 78,769.

This invention relates broadly to a lubricating system for internal combustion engines and has for one of its objects the cooling of the lubricant on its way to the parts to be lubricated. Accordingly the lubricant is pumped from the crank case through a passage about which relatively cool fluid circulates whereby the heat of the lubricant is taken up by the fluid. Another object of the invention is the warming, to a degree, of the combustible mixture on its way to the intake valves of the engine. To this end the relatively warm lubricant from the crank case is brought into contact with the walls of the intake manifold thereby warming those walls and wherefrom the heat is imparted to the mixture. The invention also resides in the attainment of the foregoing objects by a single instrumentality in the interest of simplicity, compactness and efficiency of operation. This aspect of the invention is accomplished by pumping the lubricant from the crank case to a jacket surrounding the intake manifold, about which jacket relatively cool fluid is circulated and the lubricant is permitted to flow downwardly through the jacket in contact with the walls thereof and with the intake manifold whereby a heat interchange takes place between both the relatively cool fluid and the relatively cool mixture from the carbureter and the lubricant is conducted from the heat interchanging device to the parts to be lubricated in a substantially cool condition. A further object of the invention is the utilization of the cooled lubricant as a cooling medium for portions of the engine. To this end a portion of the lubricant flowing from a heat interchanging device is diverted in its circulation and directed against the walls of the cylinders. More particularly a passage is formed circumferentially of each cylinder to which the lubricant flows and from which it flows through a plurality of apertures downwardly about the outer surfaces of the cylinder walls, thus cooling them before dropping into the sump. The invention will now be described more particularly in connection with a preferred embodiment thereof which is illustrated in the accompanying drawings, and in which:

Figure 1 is a transverse vertical sectional view taken through one of the cylinders of an air cooled internal combustion engine looking toward the rear, and showing the lubricant circulating system and the means availed of to cool the lubricant by contact with the intake manifold and the manner of cooling the cylinder walls by the flow of lubricant thereover.

Figure 2 is a view in side elevation of the engine shown in Figure 1 to which the invention is applied.

Figure 3 is a horizontal sectional view taken in the plane indicated by the line 3—3 in Figure 2 and looking in the direction of the arrows and showing the course of the lubricant from the cooling device to the cylinder walls.

In the drawings the invention is shown as applied to an air cooled internal combustion engine in which the bank of cylinders $a$ is disposed within an enclosure $b$ into which air enters from the front end $b'$. This air is deflected to the right of the cylinders, as viewed in Figure 1, where it first contacts with the jacket $c$ surrounding the intake manifold $d$ leading from the carbureter $d'$ to the intake valves $a'$ before circulating about the cylinders and exhausting through the outlet louvers $b^2$. Obviously other fluid, such as water, instead of air may be availed of to contact with the walls of jacket $c$. The lubricant within the sump $f$ of crank case $f'$ is forced by a pump $g$ driven from the engine through a pipe $h$ to the jacket $c$ through which it flows in a downward direction about the intake manifold $d$. In flowing down the intake manifold the lubricant is cooled by contact with the walls of the jacket which are cooled by contact with the inflowing cooling air, and by contact with the wall of the intake manifold where a heat interchange takes place with the relatively cooler mixture flowing to the intake valves. From the lower part of the jacket the lubricant enters a longitudinally extending conduit $i$ from whence it is conducted by pipes $j$ to the bearings $k$ of the engine crank shaft $k'$. From conduit $i$ the lubricant is also conducted to channels $f^2$ formed in the crank case $f'$ circumferentially of the cylinder walls $a^2$ and from the channels the lubricant passes through a plurality of apertures $f^3$ and flows downwardly about the outer surface of the cylinders to cool the same before dropping off into crank case.

Thus a circulatory lubricating system is provided wherein the lubricant is cooled in its flow to the bearings and is availed of to warm the incoming combustible mixture and a portion of the cooled lubricant is diverted to the walls of the cylinders to cool the same in its path back to the sump.

Various modifications may be made in the lubrication system as a whole as well as in the cooling means for the oil which may be independent, if desired, of the warming device for the combustible mixture and no limitation is intended by the foregoing description and illustrations except as indicated in the appended claims.

What we claim is:

1. The combination with an internal combustion engine having a cylinder and a lubricant reservoir, of means to conduct lubricant from the reservoir to a passage formed in the engine circumferentially of the cylinder, means to conduct lubricant from the passage to the external peripheral surface of the cylinder, and means to return the lubricant to the reservoir.

2. The combination with an internal combustion engine having a cylinder, crank case and lubricant reservoir, of means to conduct lubricant from the reservoir to a recess formed in the crank case circumferentially of the cylinder, said crank case being formed with a plurality of passages leading from the recess to the external peripheral surface of the cylinder, and means to return the lubricant to the reservoir.

3. The combination with an air cooled internal combustion engine having a cylinder, crank case, lubricant reservoir and intake passage, of a jacket surrounding the intake passage, means to conduct lubricant from the reservoir to the jacket, means to direct fluid in contact with the jacket, means to conduct lubricant from the jacket to the engine, means to conduct lubricant from the reservoir to a recess formed in the crank case circumferentially of the cylinder, said crank case being formed with a plurality of passages leading from the recess to the external peripheral surface of the cylinder and means to return the lubricant to the reservoir.

This specification signed this 5th day of December, A. D. 1925.

ALFRED F. MASURY
CHARLES FROESCH.